May 21, 1929.  V. LINK  1,713,842
BRAKE CONTROL MECHANISM
Filed June 14, 1924
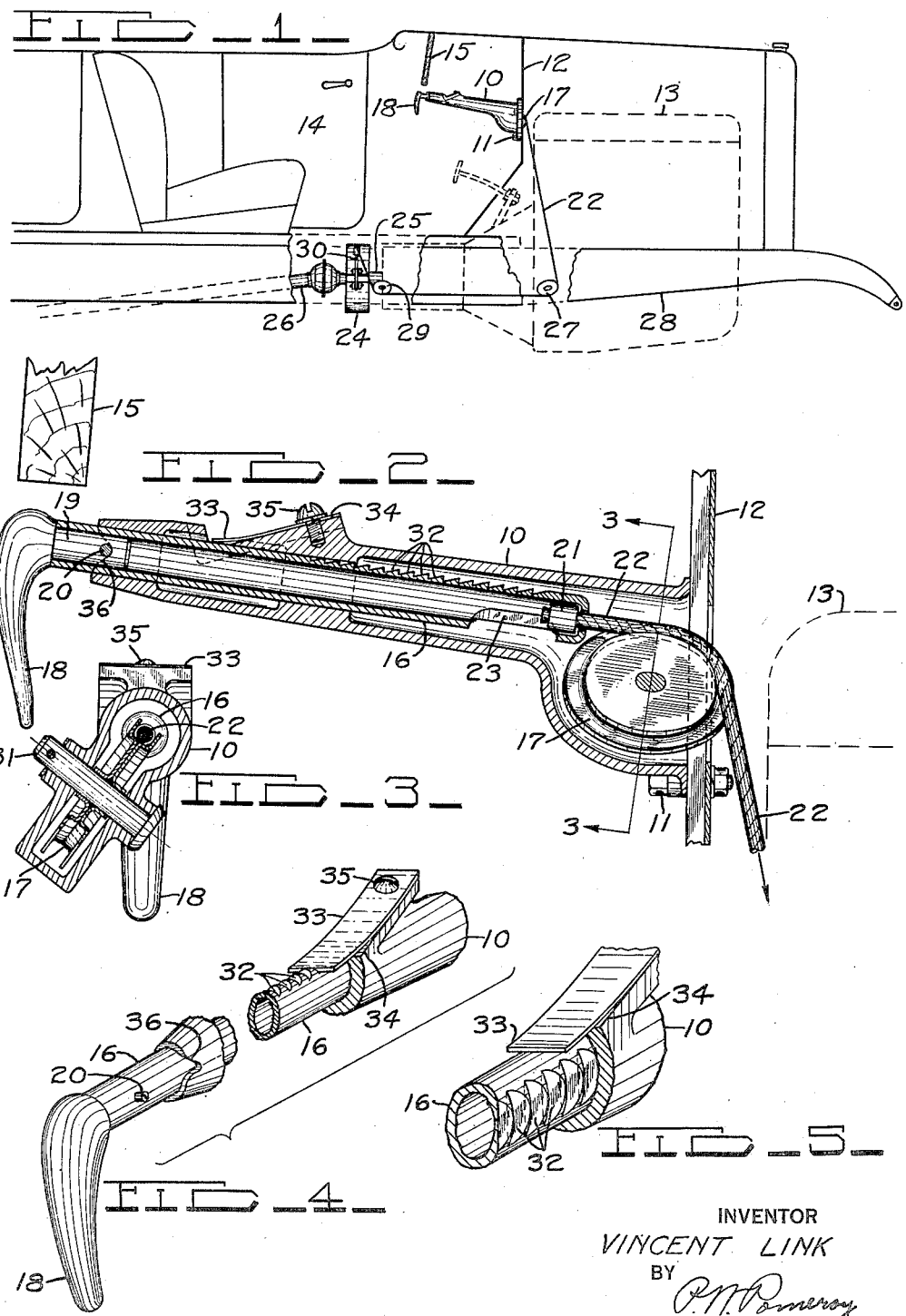
INVENTOR
VINCENT LINK
BY
P. M. Pomeroy
ATTORNEY Patented May 21, 1929.

1,713,842

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE-CONTROL MECHANISM.

Application filed June 14, 1924. Serial No. 720,093.

This invention refers to brake control means for motor vehicles and has for its principal object the providing of such a means that will be novel in construction, simple in operation, and which will remove the same from its conventional position in the center of the floor and place it in such a position as to not interfere with the leg room of the front compartment of such motor vehicles.

Another object of the present invention is to provide such a brake control mechanism that will be secured to the dash of the motor vehicle and the operating handle of which will normally be positioned beneath the instrument board thereof.

A further object of the present invention is to provide means for applying, and holding in applied position, the emergency brake of a motor vehicle, such means comprising a longitudinally movable member provided with notches in one surface thereof which are adapted to be engaged by a spring element and thus prevent retraction of the member until the same is rotated to bring the notches out of engagement with the spring element.

The above being among the objects of the present invention, the same consists of certain features of construction and combination of parts to be hereinafter described with reference to the accompanying drawing and then claimed, having the above and other objects in view.

In the accompanying drawing which illustrates a suitable embodiment of the present invention, and in which like numerals refer to like parts throughout the several views, Figure 1 is a somewhat diagrammatic fragmentary side view of a motor vehicle, the frame being broken away to show an adaptation of the present invention thereto.

Figure 2 is an enlarged sectional side view of the brake operating mechanism.

Figure 3 is a sectional view taken on the lint 3—3 of Figure 2.

Figure 4 is a fragmentary perspective view of a portion of the mechanism shown in Figure 2.

Figure 5 is an enlarged perspective view of part of the mechanism of Figure 4, showing the method utilized for releasing the extended handle.

The conventional position of the emergency brake handle or lever at the present time on motor vehicles is in the middle of the floor of the driving compartment and because of such position, offers an obstruction to the free movement of persons in such compartment. It is, therefore, particularly desirable, especially in cases where the speed change controlling devices can be, or are, also removed from the center of the floor, to remove the brake operating handle or lever from such position and to place it in such a position that the floor is left free and unobstructed by such devices. It is the object of the present invention to accomplish this result, and in accomplishment of that object the present invention provides a construction whereby the emergency brake operating mechanism is secured to the dash of the motor vehicle at a substantial distance above the floor, and extends rearwardly therefrom, the handle for operating the same being preferably positioned immediately below the instrument board, although if desired it may be constructed so as to project through the same or in other positions.

Referring to the drawing, which illustrates a suitable embodiment of the present invention adapted to an automobile, it will be seen that the structure comprises a housing 10 secured by bolts 11 or other suitable means to the dash 12 situated between the engine 13 and the driving compartment 14. The housing 10 extends rearwardly and slightly upwardly from the dash 12 and terminates short of and immediately below the instrument board 15. The housing 10 is hollowed out to provide a journal for the longitudinally movable and rotatable tubular member 16 at the rear end thereof and an enlarged housing and support for the sheave 17 at the front end thereof. A handle 18 of any suitable design, is provided with a cylindrical extending shank 19 which is adapted to be received in the rear end of the member 16 and secured therein by means of the pin 20 which passes through both the shank 19 and member 20 and projects outwardly from the surface of the latter, as shown in Figure 4, for a purpose to be described later.

The front end of the member 16 is flanged over inwardly a small amount to provide a seat for the end 21 of the flexible cable 22 which extends therefrom over the sheave 17 to suitable brake mechanism as will be described later. A portion of the metal near the front end of the member 16 is cut away as at 23 to provide an opening for easily inserting the cable 22 and end 21 in position in the member 16.

Although it is apparent that it is immaterial whether this brake operating means operates brakes acting directly on the wheels of the vehicle or on the propeller shaft, and is applicable to either, in the drawing I have shown the same as acting on a brake 24 secured to the transmission shaft 25 just ahead of the front end of the propeller shaft 26, such brakes generally being known as transmission brakes. As shown in Figure 1 the flexible cable 22 extends from the member 16 over the sheave 17 down to and around a sheave 27 suitably secured to the frame 28 of the vehicle or some other suitable place, thence to and around a sheave 29 suitably mounted in a manner similar to the sheave 27, and thence to the free end of the lever 30 on the transmission brake 24, movement of which lever 30 acts to apply the brake 24. Suitable spring members (not shown) act to keep the lever 30 normally in inoperative position. When the handle 18 is pulled rearwardly away from the housing 10 the flexible cable 22 is caused to pass around the sheaves 17, 27 and 29 and causes movement of the lever 30 to apply the brake 24. Inasmuch as the housing is preferably positioned approximately in the center of the vehicle, and the sheave 27 is preferably placed at the side, it is necessary to tilt the axis of the pin 31 upon which the sheave 17 is journaled in the casing 10, as is shown in Figure 3, in order that the cable 22 will properly track in the sheave 17, but such tilting may be varied to accommodate different positions of the sheaves 17 and 27.

In order that no muscular effort will be required to hold the handle 18 in extended or brake applying position, notches such as 32 are formed on the normally upward side of the member 16, and a flat spring 33 secured to the inclined seat 34 of the casing 10 by the screw 35, and projecting through the casing 10, presses against said upper notched surface, and its lower end is adapted to engage the notches 32 as indicated in Figure 4 and thereby prevent retractive movement of the member 16 although allowing free extensible movement of the same. When it is desired to release the member 16 from such extended position and thereby release the brake 24, the handle 18 is turned either to right or left, thereby rotating the member 16 and turning the notches 32 out of engagement with the spring 33, as is illustrated in Figure 5, thereby allowing the member 16 to be retracted back into the casing 10.

In order that the handle 18 will be normally held in such a position that upon extension of the member 16 the spring 33 will engage the notches 32 and thereby hold the member 16 in its extended position without necessity of turning the same, cam shaped recesses or notches 36 are formed in the rear edge or end of the casing 10 as shown in Figure 2 and more clearly in Figure 4, which are adapted to receive the projecting ends of the pin 20 previously described, guiding the same into and holding them in such a position that the member 16 is held in retracted position with the notches 32 uppermost.

Although I have shown one suitable embodiment of a brake operating mechanism it will be understood that formal changes may be made in the specific embodiment of the invention described without departing from the spirit or substance of the broad invention, the scope of which is commensurate with the appended claims.

What I claim is:—

1. In a motor vehicle, the combination with a dash and an instrument board; of a brake operating mechanism comprising a casing secured to said dash and projecting rearwardly therefrom to a point adjacent said instrument board; a rotatable and longitudinally movable member journaled in said casing; a handle on said member adjacent said instrument board for drawing said member outwardly from said casing; means for retaining said member in extended position when said member is moved longitudinally from its receded position; and means whereby the turning of said handle will release said first mentioned means and allow said member to recede into said casing.

2. In a motor vehicle, the combination with a dash; of a brake operating mechanism comprising a casing supported by said dash and extending rearwardly therefrom; an axially movable and rotatable member journaled in said casing conveniently accessible to the driver; means co-operating with said member for holding it in a plurality of axial positions when it is moved longitudinally from its receded position; and means whereby rotatable movement of said member in either direction from said extended position releases said holding means.

3. In a brake operating mechanism for a motor vehicle adapted to be secured thereto as a unit, comprising a casing, a shaft slidable and rotatable therein and having a notched surface within a limited circumferential area thereof, a spring secured to said casing and having an end adapted to engage said notches when said shaft is in a predetermined rotative position, and a supporting flange formed on one end of said casing comprising the sole support for said mechanism.

4. In a brake operating mechanism for a motor vehicle adapted to be secured thereto as a unit, comprising a casing, a shaft supported therein for longitudinal and rotative movement, a handle secured to said shaft exteriorly of said casing, ratchet teeth formed on a longitudinally extended but circumferentially restricted area of said shaft, a spring supported by said casing engaging said teeth when said shaft is in a predetermined rotative position and moved out of engagement with said teeth upon rotation of said shaft, an enlarged end on said casing forming an attaching flange and enclosing a sheave, and a flexible member connected to one end of said shaft and passing over said sheave.

5. A brake operating mechanism for a motor vehicle adapted to be secured thereto as a unit, comprising a casing provided with a generally tubular body portion terminating in an enlargement, a sheave rotatably mounted within said enlargement, a notched shaft longitudinally slidable and rotatable within said body portion and having a cable secured to one end thereof and engaging said sheave, and a spring engageable with the notches in said shaft for retaining said shaft in a predetermined axial and rotatable position, said spring being moved out of engagement with said notches upon rotation of said shaft.

6. A brake mechanism for a motor vehicle adapted to be secured thereto as a unit, comprising a casing, a longitudinally movable and rotatable shaft having ratchet teeth formed thereon enclosed by said casing and provided with a handle exterior of said casing, a spring engageable with said teeth for securing said shaft against longitudinal movement in one direction only when in one of its rotative positions and releasable upon rotation of said shaft, a sheave rotatably mounted within said casing, and a flexible member secured to said shaft and engaging said sheave, said parts being operatively mounted in relation to each other and attachable as a single unit to the dash of a motor vehicle at a single area of support.

Signed by me at Detroit, Michigan, U. S. A., this 7th day of June, 1924.

VINCENT LINK.